D. J. ELLIS, DEC'D.
E. ELLIS, ADMINISTRATRIX.
CULTIVATOR.
APPLICATION FILED JULY 6, 1907.
930,332.
Patented Aug. 3, 1909.
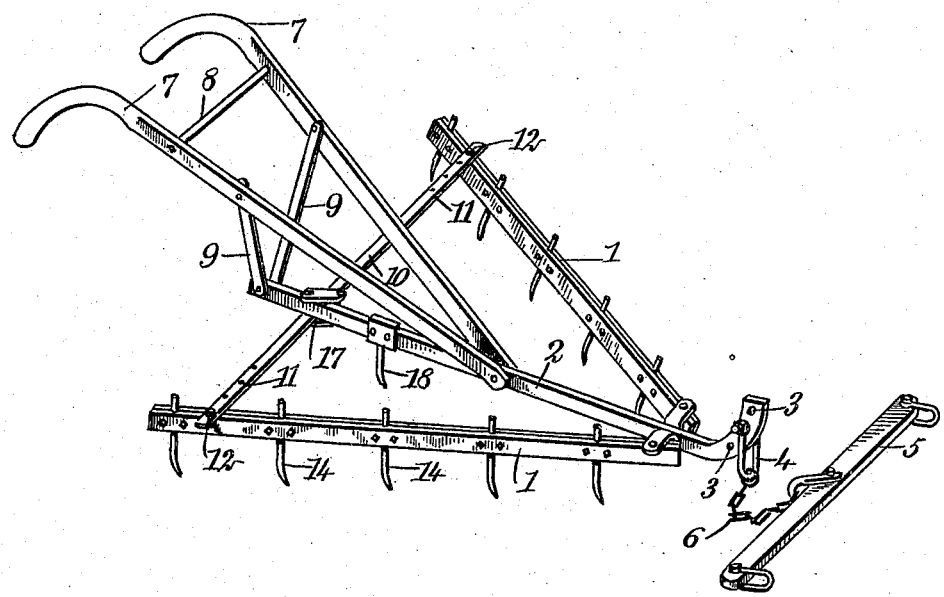
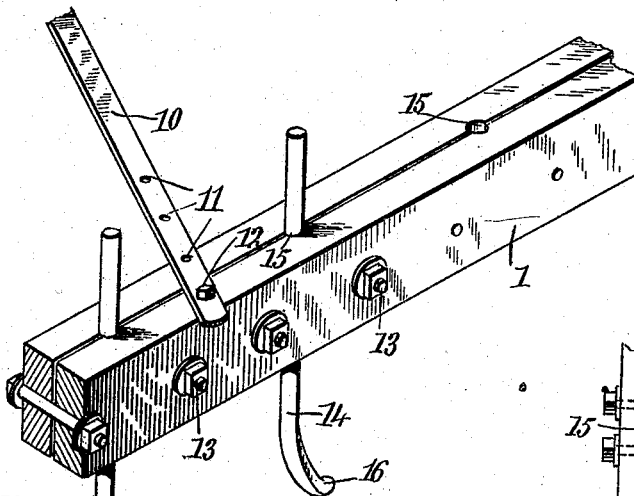
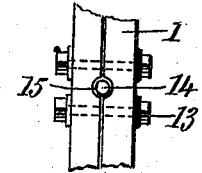
WITNESSES
INVENTOR
Daniel J. Ellis
BY Munn & Co
ATTORNEYS

UNITED STATES PATENT OFFICE.

DANIEL J. ELLIS, OF PARLIER, CALIFORNIA; ELIZABETH ELLIS ADMINISTRATRIX OF SAID DANIEL J. ELLIS, DECEASED.

CULTIVATOR.

No. 930,332.        Specification of Letters Patent.        Patented Aug. 3, 1909.

Application filed July 6, 1907. Serial No. 382,437.

*To all whom it may concern:*

Be it known that I, DANIEL J. ELLIS, a citizen of the United States, and a resident of Parlier, in the county of Fresno and State of California, have invented a new and Improved Cultivator, of which the following is a full, clear, and exact description.

My invention relates to cultivators, and has for its object to provide a cultivator with teeth which may be adjusted as to depth and which may also be rotated in the teeth bar so that the cutting edge may be turned to any desired angle relatively to the said bar.

Another object of my invention is to provide teeth which are without angles to permit the weeds to become fastened thereon when the cultivator is lifted.

Still another object of the invention is to provide a cultivator simple in construction, one which can be adjusted to all kinds of work and one which can be economically manufactured.

In this specification I will describe the construction shown in the accompanying drawings but I do not limit myself thereto as I consider myself entitled to all forms and embodiments of the invention which may be held to fall within the scope of the appended claims.

In the drawings similar characters of reference refer to similar parts in all the figures, in which—

Figure 1 is a perspective view of the cultivator; Fig. 2 is a perspective fragmentary view of one of the teeth bars; and Fig. 3 is a cross section of the teeth bar showing the method of securing its members together.

Referring to the drawings it will be seen that the teeth bars 1, are pivotally connected at their forward ends to the draw bar 2. The draw bar extends forward of the teeth bars and has orifices 3, in which the clevis 4, may be secured. I prefer to attach the whiffletree 5, to the clevis by a chain 6. The draw bar extends to the rear of the cultivator and has handles 7, bolted to its middle portion, the said handles being spaced apart by a rod 8, and being further secured to the draw bar by braces 9. The teeth bars on their rear ends are secured together by a transverse bar 10, having orifices 11, in its terminals and pins 12, pass through these orifices and extend into the teeth bars in order to regulate the teeth bars and have them extended or close together. The teeth bars 1, are made in two sections with bolts 13 clamping them together, and the teeth 14 are clamped between these two members of the teeth bar 1, the members of the teeth bar having an annular hole 15, cut therein, said annular hole being of the same size as the teeth in order that the teeth may not slip when the members of the teeth bar 1, are bolted together. I prefer to construct the teeth bars in this way. To bore holes in a single member, the said holes being of the same size as the teeth and then to saw the said member apart through the said holes, and thereby form the two members between which the teeth may be clamped. On the draw bar 2, is secured a tooth 18, which cuts the soil between the teeth in the teeth bars. The teeth 14, have their shanks cylindrical in form so that the cutting edges 16 of the said teeth may be turned to various angles relatively to the teeth bar, by rotating the shank before the members of the teeth bar are clamped firmly together. It is in this way possible to make any minute change in the angle of the teeth, without in any way altering the construction of the several parts. The form of the teeth is such that they will not hold the weeds when the cultivator is lifted from the ground. The transverse bar 10, is clamped to the draw bar 2 by a fastener 17, which may be removed when it is desired to change the relative positions of the teeth bars 1.

By the use of the cultivator just described, it is possible to draw the teeth bars together and firmly secure them in this new position, and as the teeth 14 may be rotated relatively to teeth bars the cutting faces of the teeth act against the earth in the same way that they do before the positions of the teeth bars were altered.

Having thus described my invention, I claim as new and desire to secure by Letters Patent:

1. A cultivator, comprising a draw bar having a curved forward end provided with a plurality of openings, teeth-bars pivoted at their forward ends to the forward end of the draw bar, a transverse bar having its ends resting upon the teeth-bars and provided therein with a plurality of openings, pins passing through the openings of the transverse bar into the teeth-bars, a clamp for adjustably and removably securing the transverse bar to the draw bar near its rear end, handles having their forward ends secured to the draw bar intermediate of its ends, and braces secured to the rear end of the draw bar and to the handles.

2. A cultivator, comprising a draw bar, teeth-bars pivoted at their forward ends to the forward end of the draw bar, a transverse bar having its ends resting upon the teeth-bars and provided with openings therein, pins passing through the openings of the transverse bar into the teeth-bars, a clamp for adjustably securing the transverse bar to the draw bar near its rear end, and handles secured to the draw bar.

In testimony whereof I have signed my name to this specification in the presence of two subscribing witnesses.

DANIEL J. ELLIS.

Witnesses:
C. W. MATHEWS,
A. L. BOLLIN.